(12) United States Patent
Leinen et al.

(10) Patent No.: US 9,295,142 B1
(45) Date of Patent: Mar. 22, 2016

(54) POWER OVER ETHERNET LIGHTING SYSTEM

(71) Applicant: LEVITON MANUFACTURING CO., INC., Melville, NY (US)

(72) Inventors: Richard A. Leinen, Wilsonville, OR (US); Robert L. Hick, Newberg, OR (US); Gregory Galluccio, Hauppauge, NY (US)

(73) Assignee: LEVITON MANUFACTURING CO., INC., Melville, NY (US)

( * ) Notice: Subject to any disclaimer, the term of this patent is extended or adjusted under 35 U.S.C. 154(b) by 0 days.

(21) Appl. No.: 14/597,688

(22) Filed: Jan. 15, 2015

(51) Int. Cl.
| | |
|---|---|
| H05B 37/00 | (2006.01) |
| H05B 39/00 | (2006.01) |
| H05B 41/00 | (2006.01) |
| H05B 37/02 | (2006.01) |
| H05B 33/08 | (2006.01) |

(52) U.S. Cl.
CPC ........ *H05B 37/0263* (2013.01); *H05B 33/0815* (2013.01); *H05B 33/0854* (2013.01)

(58) Field of Classification Search
None
See application file for complete search history.

(56) References Cited

U.S. PATENT DOCUMENTS

| | | | |
|---|---|---|---|
| 7,587,289 B1 | 9/2009 | Sivertsen | |
| 7,885,250 B2 | 2/2011 | Whittaker | |
| 8,058,750 B2 | 11/2011 | Covaro et al. | |
| 8,159,156 B2 | 4/2012 | Henig et al. | |
| 8,207,635 B2 | 6/2012 | Covaro | |
| 8,248,230 B2 | 8/2012 | Covaro et al. | |
| 8,344,641 B1 | 1/2013 | Isaacson et al. | |
| 8,390,441 B2 | 3/2013 | Covaro et al. | |
| 8,427,300 B2 | 4/2013 | Covaro et al. | |
| 8,662,734 B2 | 3/2014 | Covaro | |
| 8,706,310 B2 | 4/2014 | Barrilleaux | |
| 8,710,759 B1 | 4/2014 | Isaacson et al. | |
| 8,710,772 B2 | 4/2014 | Henig et al. | |
| 8,729,835 B2 | 5/2014 | Henig et al. | |

(Continued)

FOREIGN PATENT DOCUMENTS

| | | |
|---|---|---|
| WO | 2014002073 A1 | 1/2014 |
| WO | 2014024064 A2 | 2/2014 |

(Continued)

OTHER PUBLICATIONS

Boyce et al., "Low Voltage LED Lighting Control System"; Project Plan, May 13, 2013.

(Continued)

*Primary Examiner* — Anh Tran
(74) *Attorney, Agent, or Firm* — Kacvinsky Daisak Bluni PLLC

(57) ABSTRACT

A system for controlling a plurality of LED lighting fixtures includes a Power over Ethernet (PoE) LED driver coupleable to a PoE switch via a first power and communication link. The PoE LED driver includes a microcontroller for receiving first power and control signals from the PoE switch and for controlling a first LED driver chip to operate an LED lighting fixture in response thereto. An LED slave controller is connected to the PoE LED driver via a second power and communication link. The LED slave controller includes a second LED driver chip for receiving second power and control signals from the microcontroller to operate an LED lighting fixture in response. The first power and control signals are different from the second power and control signals. The first power and communication link is a CAT5/CAT6 cable. The second power and communication link is a CAT5/CAT6 or other cable type.

26 Claims, 5 Drawing Sheets

(56) References Cited

U.S. PATENT DOCUMENTS

| | | |
|---|---|---|
| 8,742,680 B2 | 6/2014 | Cowburn |
| 8,890,663 B2 | 11/2014 | Covaro et al. |
| 8,890,679 B2 | 11/2014 | Covaro et al. |
| 2009/0066486 A1* | 3/2009 | Kiekbusch et al. ...... 340/286.02 |
| 2011/0199004 A1 | 8/2011 | Henig et al. |
| 2011/0273108 A1* | 11/2011 | Sivertsen ...................... 315/250 |
| 2012/0223650 A1 | 9/2012 | Radermacher |
| 2012/0271477 A1 | 10/2012 | Okubo et al. |
| 2012/0275084 A1 | 11/2012 | Familiant et al. |
| 2013/0107041 A1* | 5/2013 | Norem et al. ................. 348/143 |
| 2013/0119892 A1 | 5/2013 | Feri et al. |
| 2013/0144448 A1 | 6/2013 | Luerkens et al. |
| 2013/0151025 A1 | 6/2013 | Wendt et al. |
| 2013/0159754 A1 | 6/2013 | Wendt |
| 2013/0193873 A1 | 8/2013 | Isaacson et al. |
| 2014/0232299 A1 | 8/2014 | Wang |
| 2014/0371876 A1 | 12/2014 | Isaacson |

FOREIGN PATENT DOCUMENTS

| | | |
|---|---|---|
| WO | 2014024072 A2 | 2/2014 |
| WO | 2014033575 A1 | 3/2014 |
| WO | 2014045154 A1 | 3/2014 |
| WO | 2014060890 A2 | 4/2014 |
| WO | 2014162279 A1 | 10/2014 |
| WO | 2014198533 A2 | 12/2014 |
| WO | 2014206797 A1 | 12/2014 |

OTHER PUBLICATIONS

Brossart et al., "Ember" Final Paper, Apr. 29, 2013.
Boyce et al. "Ember" Final Presentation, May 13, 2013.
Commscope White Paper; 2014.

* cited by examiner

POWER OVER ETHERNET LIGHTING SYSTEM

FIELD OF THE DISCLOSURE

The present disclosure relates generally to power arrangements for lighting systems, and more particularly to an improved arrangement for controlling and powering light emitting diode (LED) lighting systems using Power over Ethernet (PoE).

BACKGROUND OF THE DISCLOSURE

Power over Ethernet (PoE) is a technology for supplying low voltage current and data over a common point-to-point Ethernet network cable to locations with applications that require both mediums. In some cases power is carried on the same conductors that carry data. In other cases power is carried on dedicated conductors within the same cable. Applications that currently benefit from PoE technology include Voice over Internet Protocol (VoIP), IP cameras, wireless local area networks (WLAN), Wireless Access Points, Building Automation Systems (BAS), and security and access control systems.

PoE currently has two standards: Institute of Electrical and Electronics Engineers (IEEE) 802.3af (the original PoE standard) and IEEE 802.3at (known as PoE plus), which provide, respectively, about 13 Watts and about 25.5 Watts of power to connected devices. In addition, a new standard is being developed that is intended to provide upwards of 50 Watts of power to connected devices.

PoE has several advantages over traditional power systems used in homes and commercial buildings. For example, PoE systems are relatively low voltage, thus eliminating the need to run expensive high voltage wiring and conduit for lighting. In addition, installation of PoE wiring can be faster than with traditional power systems because Ethernet cabling employs simple plug-in end connections. Where Ethernet cabling is already in place (i.e., for data transmission), PoE functionality can be achieved without the need for additional wiring installation.

With the increase in power provided by modern PoE systems, it would be desirable to provide a PoE system capable of controlling and powering a variety of light emitting diode (LED) lighting system components. The system should be inexpensive, easy to install, and easy to configure and control. The system should also be able to power and/or control other low voltage devices, such as occupancy sensors, photodetectors, wall switches and the like.

SUMMARY OF THE DISCLOSURE

A system for controlling an LED lighting system can include a Power over Ethernet (PoE) LED driver coupleable to a PoE switch via a first power and communication link. The PoE LED driver can include a microcontroller for receiving first power and control signals from the PoE switch and for controlling a first LED driver chip to operate an associated LED lighting fixture in response thereto. An LED slave controller can be coupled to the PoE driver via a second power and communication link. The LED slave controller may include a second LED driver chip configured to receive second power and control signals from the microcontroller to operate an associated LED lighting fixture in response thereto. The first power and control signals can be different from the second power and control signals. The first power and communication link can be a CAT5 cable, a CAT6 cable, or any other cable type capable of carrying power and control signals.

A system for controlling an LED lighting system can include a Power over Ethernet (PoE) LED driver coupleable to a PoE switch via a first power and communication link. The PoE LED driver can include a microcontroller for receiving first power and control signals from the PoE switch and for controlling a first LED driver chip to operate an associated LED lighting fixture in response thereto. A plurality of LED slave controllers can also be provided. Each of said plurality of LED slave controllers can include a second LED driver chip for receiving second power and control signals from the microcontroller on one of a plurality of second power and communication links to operate an associated LED lighting fixture in response thereto. A first one of said plurality of LED slave controllers can be coupled to the first LED driver chip of the PoE LED driver via a first one of said plurality of second power and communication links. A second one of said plurality of LED slave controllers can be coupled to the first one of said plurality of LED slave controllers via a second one of said plurality of second power and communication links. A third one of said plurality of LED slave controllers can be coupled to the second one of said plurality of LED slave controllers via a third one of said plurality of second power and communication links. The first power and control signals may be different from the second power and control signals. The first power and communication link and the plurality of second power and communication links can be CAT5 cables, CAT6 cables, or any other cable type capable of carrying power and control signals.

A method for controlling an LED lighting system includes: receiving, at a Power over Ethernet (PoE) driver, first power and control signals; conditioning the received first power and providing the conditioned power to a microcontroller associated with the PoE LED driver; conditioning the first control signals and providing the conditioned control signals to the microcontroller; receiving, at a first LED driver chip associated with the PoE driver, the conditioned power and the conditioned control signals and operating an LED lighting fixture in response thereto; and receiving, at a second LED driver chip associated with an LED slave controller, the conditioned power and the conditioned control signals and operating an LED lighting fixture in response thereto. The first power and control signals can be provided to the PoE driver via a first power and control signal communication link. The conditioned power and conditioned control signals can be provided to the second LED driver chip via a second power and control signal communication link. In some embodiments the first and second power and control signal communication links are Ethernet cables.

BRIEF DESCRIPTION OF THE DRAWINGS

By way of example, a specific embodiment of the disclosed device will now be described, with reference to the accompanying drawings, in which.

DETAILED DESCRIPTION

A system and method are disclosed for powering and controlling a variety of lighting system components using PoE technology. In some embodiments the lighting systems include a plurality of light fixtures including one or more light emitting diode (LED) elements. With increased power (e.g., up to 50 Watts, and likely more in the future) provided over Ethernet cabling, it can be practical to power one or more LED fixtures using PoE. To harvest the power from the Ethernet cable, an LED fixture can employ a simple bridge rectifier along with a resistive "signature" (as described, for example, in Institute of Electrical and Electronics Engineers (IEEE) 802.3at standard) to communicate the LED fixture's power needs. This circuit can be connected directly to the Ethernet input transformer. The rectified power can then be fed to an LED driver circuit to power the individual LEDs in the LED fixture. In some embodiments a DC-DC power conversion can be employed to provide power to a microcontroller which can receive commands via the Ethernet cable and can signal the LED driver circuit with intensity information. In some embodiments commands will be issued to the microcontroller from any of a variety of sensors and/or switches that provide state information (e.g., button pressed, occupancy detected). The microcontroller can then determine the state (e.g., on, off, dimming level) for each LED driver in the system.

Providing this ease of installation and flexibility of control can be an advantage. Providing the electronics described above for each individual LED fixture, however, can be expensive. In view of this, the disclosed system can include an arrangement in which DC power and a control output generated with the aforementioned electronics are daisy chained from a primary fixture to other, simpler, fixtures that are fitted with only a simplified LED driver circuit. The result can be a system in which several fixtures that would normally be controlled together can be powered and controlled relatively easily and inexpensively. The daisy chained arrangement can be implemented due to the fact that increased transmitted power levels (e.g., up to 50 Watts) make it possible to power more than one LED fixture connected in series.

Figure 1:
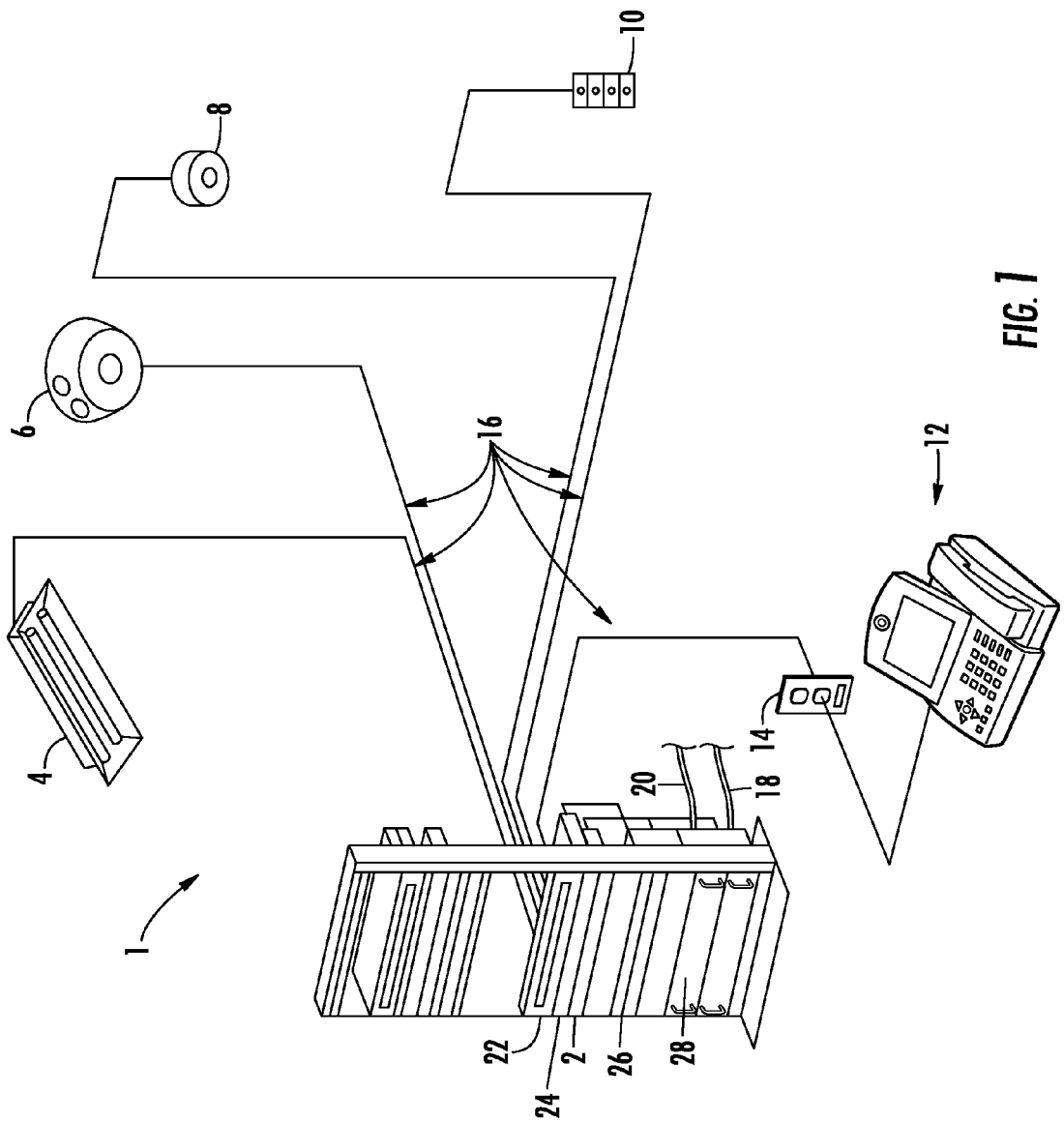
FIG. 1 shows an exemplary Power over Ethernet (PoE) lighting system according to the disclosure.

Referring to FIG. 1, a lighting power and control system 1 may include a PoE switch 2 coupled to a light fixture 4, an occupancy sensor 6, a photodetector 8 and a first wall switch 10 via first power and communications links 16. It will be appreciated that although the figures and description identify an occupancy sensor 6, a photodetector 8 and a first wall switch 10, that the system 1 is not so limited, and virtually any kind of sensor(s) including $CO_2$ detectors, humidity detectors, motion detectors, air quality sensors, power meters and any other information gathering, sensing, and/or control devices can be integrated into this system. Further, although the description will proceed by referring to a PoE switch 2, it will be appreciated that a PoE midspan could alternatively be used. Thus, for purposes of this disclosure, the term PoE switch 2 shall be understood to encompass a PoE midspan. The PoE switch 2 may also be coupled to communications stations such as an IP phone 12 via a wall plate 14, but this is not necessary. First power and communication links 16 between the PoE switch 2 and each of the individual identified components can be an appropriate Ethernet cable. In some non-limiting exemplary embodiments, the Ethernet cable is a CAT5 cable, a CAT6 cable, or any other cable type capable of carrying power and control signals. Alternatively, in some embodiments, one or more of the occupancy sensor 6, photodetector 8, first wall switch 10, or other information gathering, sensing, and/or control device(s) may be low-voltage devices that do not connect to the PoE switch 2 via an Ethernet cable, but rather connect to the system via appropriate low-voltage wiring. In addition, although the illustrated embodiment shows each of the components coupled to individual channels of the PoE switch 2 via separate Ethernet cables, as will be described in greater detail later some or all of these components may instead be daisy chained together so that they connect to a single channel of the PoE switch.

The PoE switch 2 may include a line power connection 18 for receiving power from a building power source. As will be understood, the PoE switch 2 is a network switch that has PoE injection (i.e., power injection) built in. That is, the PoE switch 2 takes in line power, conditions it, and injects it onto one or more conductors of the first power and communications link 16 to power a connected device. The PoE switch 2 may also include a network connection 20 for receiving control signals from one or more remote control systems such as a building automation system (BAS). The BAS can be used to monitor and/or control one or more components of the lighting power and control system 1 via the associated first power and communications links 16.

In the illustrated embodiment, the system 1 can optionally include a PoE patch panel 22, an additional PoE midspan device 24, a power distribution unit 26 and an uninterruptible power supply 28 for powering and controlling a variety of powered and non-powered devices associated with the system. In some embodiments a PoE midspan device can provide power efficiency by being placed closer to the associated loads, thus resulting in less power loss over the Ethernet cable. It will be appreciated that although the PoE switch 2 and/or other components of system 1 have been described as receiving power from a building power source, the system is not so limited. Thus, the PoE switch 2 and/or other system components can receive power from any of a variety of power sources, including solar or wind power systems, battery backup systems, an uninterruptible power supply (UPS) or any other appropriate source of power. In addition, the PoE switch 2 and/or other system components may be powered by more than one source or type of power.

Figure 2:
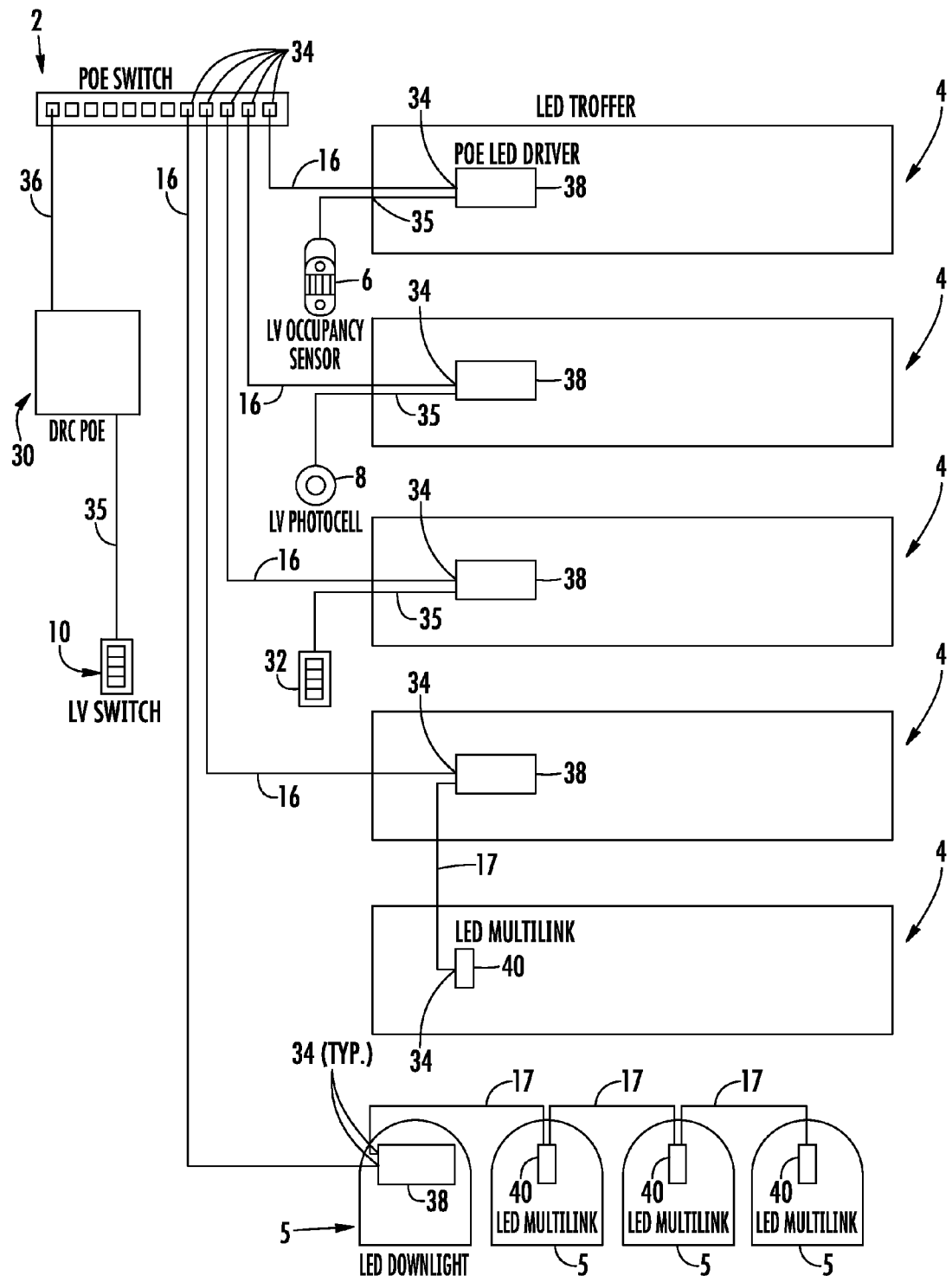
FIG. 2 is a schematic diagram of an exemplary embodiment of a PoE lighting system according to the disclosure.

FIG. 2 shows a detailed interconnection of the components of system 1, including a PoE switch 2, a plurality of first light fixtures 4, a plurality of second light fixtures 5, a low-voltage occupancy sensor 6, a low-voltage photodetector 8, and a first low-voltage wall switch 10. A digital room controller (DRC) 30 can be coupled between the first low-voltage wall switch 10 and the PoE switch 2. In one embodiment the DRC 30 can provide a low-voltage interface for the first low-voltage wall switch 10 and/or other control mechanism(s) (e.g., an occupancy sensor) and can control operation of one or more of the first and second light fixtures 4, 5 via the PoE switch 2. A second low-voltage wall switch 32 is shown associated with a particular one of the plurality of first light fixtures 4. The functionality of the second low-voltage wall switch 32 will be described in greater detail later.

Thus arranged, the PoE switch 2 may provide power to the plurality of first and second light fixtures 4, 5 via associated first and/or second power and communications links 16, 17. The PoE switch 2 may also provide power to the associated low-voltage devices such as the occupancy sensor 6, the photodetector 8 and the wall switches 10, 32, as will be described in greater detail later. The PoE switch 2 additionally can provide power to the DRC 30, which, in turn can be used to provide power, along with state input, to one or more sensors or switches.

The wall switches 10, 32 can be used to control operation of one or more of the plurality of first and second light fixtures 4, 5 in a desired manner. In the illustrated embodiment the first wall switch 10 may be used to simultaneously control operation of all of the plurality of first and second light fixtures 4, 5. Alternatively, the first wall switch 10 may, via the DRC 30, selectively control operation of just the first light fixtures 4 or just the second light fixtures 5. The second wall switch 32, via the DRC 30, may be used to control operation of the single light fixture (in this instance, one of the first light fixtures 4) to which it is connected, or it can be used to control operation of any, all or a selected group of the first and second light fixtures 4, 5.

In some embodiments, the DRC 30 may receive state information (e.g., on, off, dimming) from one or more of the low voltage occupancy sensor 6, photocell 8 and first and second wall switches 10, 32. Based on that received state information the DRC 30 may control actuation of any or all of the first and second light fixtures 4, 5, including, but not limited to, automatic or manual dimming control, daylight harvesting and the like. It will be appreciated that the aforementioned control arrangement is merely exemplary, and other arrangements are contemplated. For example, state information received by the DRC from the second wall switch 32, occupancy sensor 6 and/or photocell 8 may be used to control a subset of the first and/or second plurality of light fixtures 4, 5 in lieu of a single light fixture.

Each of the plurality of first and second light fixtures 4, 5 may be coupled directly or indirectly to the PoE switch 2 via an associated first or second power and communication link 16, 17. In some embodiments the first and second power and communications links 16, 17 can be CAT5 or CAT6 cables, or any other cable type capable of carrying power and control signals. In other embodiments, the second power and communications link 17 may simply be a power cable. Connections between the first or second power and communication links 16, 17 and associated components may, for example, be via suitable connectors 34 such as RJ45 connectors. The DRC 30 may be coupled to the PoE switch 2 via a separate power and communication link 36, which can be an Ethernet cable (i.e., CAT5, CAT6 or any other cable type capable of carrying power and control signals) similar to that used for the first and/or second power and communication links 16, 17. In the illustrated embodiment the first wall switch 10 is coupled to the DRC 30 via suitable low-voltage wiring 35.

To power and control the individual lighting elements of the system 1, at least one of the plurality of first and second light fixtures 4, 5 can include a PoE LED driver 38 to condition the power received from the PoE switch 2 and to receive and react to control signals received from a control source such as the first wall switch 10. At least one other of the first and second light fixtures 4, 5 may include an LED slave controller 40 connected to the PoE LED driver 38. The LED slave controller 40 can be controlled by the PoE LED driver to drive additional connected LED fixtures without the need for additional power, signal conditioning and/or an additional microcontroller. The PoE LED driver 38 may receive command signals via the PoE switch 2 and may control the connected first and second light fixtures 4, 5 accordingly. In the illustrated embodiment, the PoE LED drivers 38 are directly connected to the PoE switch 2 via the first communications links 16, while the LED slave controllers 40 are connected, directly or indirectly, to an associated PoE LED driver via the second communications links 17.

Thus arranged, one or more of the first or second light fixtures 4, 5 that includes a PoE LED driver 38 can be used to control and power one or more connected first or second light fixtures 4, 5 that include an LED slave controller 40. LED slave controllers can be daisy chained from a single PoE LED driver. All power and control to the LED slave controllers 40 can be provided by that single PoE LED driver. In the illustrated embodiment there is no slave-to-slave power or control method. In the illustrated embodiment, four of the first light fixtures 4 include a PoE LED driver 38, while a fifth includes the LED slave controller 40. Only one of the second light fixtures 5 includes a PoE LED driver 38, while three others include an LED slave controller 40. It will be appreciated by one of ordinary skill in the art that this is merely an illustration of one exemplary combination of PoE LED drivers 38 and LED Slave controllers 40, and others are contemplated.

PoE LED driver 38 can power and control one or more LED slave controllers 40 via an associated second power and communication link 17, which in one embodiment is an Ethernet cable. In addition, the PoE LED driver 38 can also power one or more low voltage devices, such as a low voltage occupancy sensor 6, a low voltage photocell 8 or a low voltage wall switch 32 via appropriate low voltage wiring 35. Signals from the low voltage devices 6, 8, 32 will be passed back through the system and the PoE switch 2 to the DRC 30, which will control operation of the system in accordance with the received signals.

Figure 3:
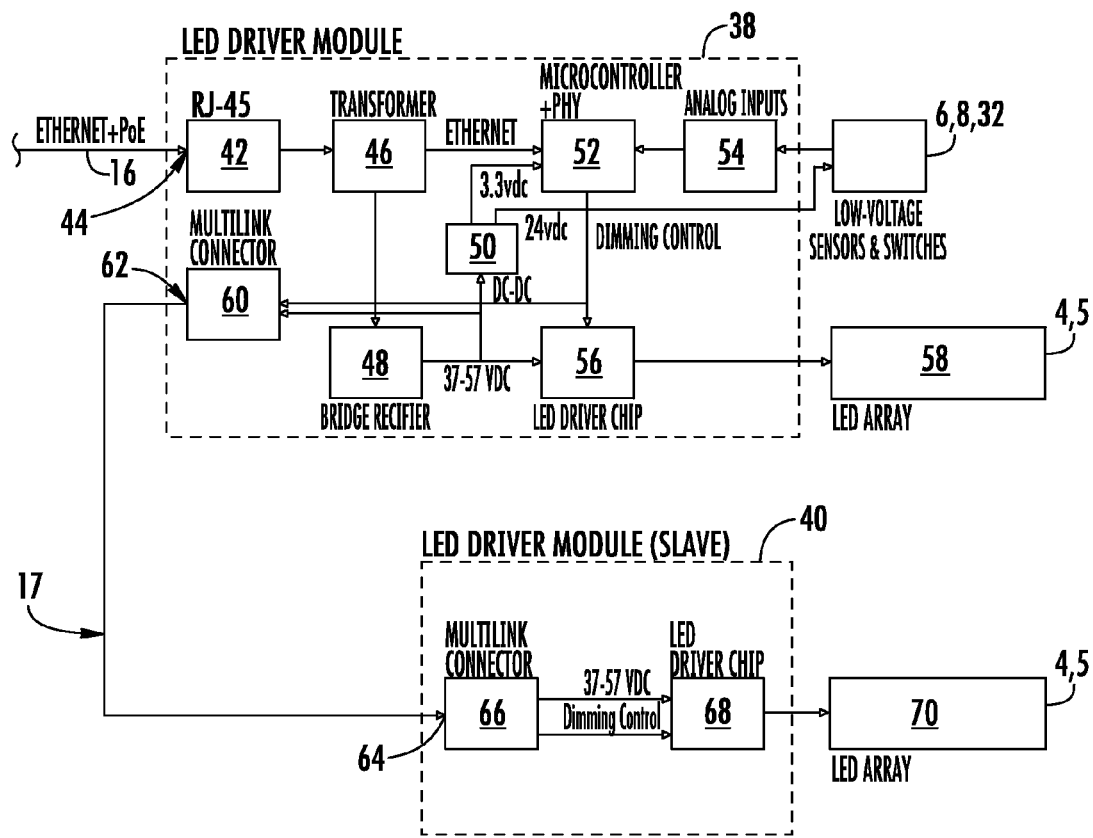
FIG. 3 is a schematic diagram of an exemplary PoE LED driver and LED slave controller for the system of FIG. 2.

Referring now to FIG. 3, exemplary embodiments of the disclosed PoE LED driver 38 and LED slave controller 40 will be described. In the disclosed lighting power and control system 1, each of the plurality of first and second light fixtures 4, 5 will have a controller, which in the illustrated embodiment will be either the PoE LED driver 38 or the LED slave controller 40. The PoE LED driver 38 or the LED slave controller 40 can be used to control on/off status, dimming, and other desired characteristics of the associated first and second light fixtures 4, 5.

As previously noted, the PoE LED driver 38 can have enhanced signal and power conditioning circuitry as compared to the LED slave controller 40. The PoE LED driver 38 can be connected to a plurality of LED slave controllers 40 to enable the LED slave controllers to benefit from the signal and power conditioning provided by the PoE LED driver 38. The LED slave controllers 40 are, in this way, simplified control devices which can reduce overall system complexity and cost. That is, the disclosed lighting power and control system 1 can include a smaller number of more complex PoE LED drivers 38 and a larger number of simpler LED slave controllers 40.

The embodiment illustrated FIG. 3 shows a single LED slave controller 40 connected to a PoE LED driver 38. It will be appreciated, however, that in practical application a larger number of LED slave controllers 40 can be connected to a single PoE LED driver 38 (for example, as shown in FIG. 2), limited only by the amount of power that can be transmitted via the first and second power and communications links 16, 17.

PoE LED driver 38 may include a connector 42, such as an RJ-45 connector, for receiving an end connector 44 of an associated first power and communication link 16 to thereby receive power and communications signals from the PoE switch 2. The connector 42 can be coupled to an appropriate Ethernet transformer 46 with center taps to allow for PoE to be transmitted through the PoE LED driver 38. The signal is split to bridge rectifier 48, which extracts power from the first power and communication link 16 via the Ethernet transformer 46 to provide a desired voltage, depending on the length of the first power and communication link 16. In one non-limiting exemplary embodiment, the voltage may be about 37-57 Volts DC (VDC). The transformed and rectified power is then provided to a DC-DC power converter 50 which provides a first voltage to power a microcontroller 52 and associated electronics, and a second voltage to associated low voltage sensors and switches, such as occupancy sensor 6, photodetector 8, and wall switch 32. In one non-limiting exemplary embodiment, the first voltage is up to about 3.3 VDC, while the second voltage is about 24 VDC.

In addition to taking power from the bridge rectifier 48, the microcontroller 52 also takes input directly from the Ethernet transformer 46 so that control signals carried by the first power and communication link 16 can be applied to the microcontroller. The microcontroller 52 can include a physical layer (PHY). The PHY may connect a link layer device such as Media Access Control (MAC) to the physical Ethernet cable medium. The PHY device can also include a Physical Coding Sublayer (PCS) and a Physical Medium Dependent (PMD) layer.

The microcontroller 52 can also be connected to the low voltage sensors and switches, such as occupancy sensor 6, photodetector 8 and second wall switch 32, to receive analog inputs 54 therefrom. The microcontroller 52 can sense the state of the switch 32, sensor 6 or photodetector 8 and can send that information to the DRC 30 via the first power and communications link 16. The DRC 30 may then control the PoE LED driver 38 based on this state information. The analog inputs 54 at the LED driver modules merely provide a means for getting the state of the sensor, photodetector or switch onto the network. As such, the particular PoE LED driver 38 to which the low voltage devices are directly connected may not be important in terms of the ability of the low voltage devices to affect the operation of the first and/or second light fixtures 4, 5.

Either in response to control signals received via the PoE switch 2 or from the analog inputs 54, the microcontroller 52 may provide an output signal, which in one exemplary embodiment, may include a dimming control signal, to an LED driver chip 56 to control a lighting level of one or more of the first and second light fixtures 4, 5. It will be appreciated that a direct control connection from the analog inputs is not required, though it may be advantageous for small systems. It will also be appreciated that although the description will proceed with reference to a driver "chip," that the system may instead be implemented using a driver "circuit," in lieu of a discrete chip. Thus, the term "chip" will be understood throughout this disclosure to include either a discrete chip, an appropriate circuit, or a combination thereof.

As can be seen the LED driver chip 56 is supplied with a driving voltage from the bridge rectifier 48. In one non-limiting exemplary embodiment this driving voltage is about 37-57 VDC. The LED driver chip 56 can connect to an LED array 58 associated with the plurality of first and second light fixtures 4, 5 to provide a constant current to the LED array. This constant current can be tuned to the specific LED array 58 to meet the particular needs of the array. In one embodiment, the LED driver chip 56 can have the capability to be commanded to vary the constant current via its I²C interface. Alternately, an external resistor (not shown) can be employed to set the current level. In some embodiments the LED driver chip 56 may have a set amount of current. In other embodiments the current may be programmable via the first power and communications link 16 or other link coupled to the chip's I²C interface.

In one embodiment, the maximum current that a particular LED array 58 requires is what the LED driver chip 56 will provide. To dim the LED array 58, the LED driver chip 56 can employ pulse width modulation (PWM) in a manner known to those of ordinary skill in the art. It will be appreciated that dimming techniques other than, or in addition to, PWM can be used to provide a desired dimming function.

An LED slave controller 40 may be coupled to an output of the PoE LED driver 38, to receive power and control signals from the PoE LED controller. Control signals from the microcontroller 52, and power (e.g., 37-57 VDC) from the bridge rectifier 48 can be provided to an output connector 60, which in one exemplary embodiment is an RJ-45 connector. The second power and communication link 17 may have a first end connector 62 for coupling to the output connector 60, and a second end connector 64 for coupling to an input connector 66 of the LED slave controller 40. Thus, arranged, the control signals from the microcontroller 52 and power from the bridge rectifier 48 can be provided to an LED driver chip 68 of the LED slave controller 40. In some embodiments the LED driver chip 68 of the LED slave controller 40 can be the same as the LED driver chip 56 of the PoE LED driver 38, though this is not necessary. As will also be appreciated, that although the description will proceed with reference to a driver "chip" associated with the LED slave controller 40, the system may instead be implemented using a driver "circuit," in lieu of a discrete chip. Thus, the term "chip" I in relation to the LED slave controller 40 will be understood in this disclosure to include either a discrete chip, an appropriate circuit, or a combination thereof.

The LED driver chip 68 of the LED slave controller 40 can connect to an LED array 70 associated with one of the plurality of first and second light fixtures 4, 5 to provide a constant current to the LED array. This constant current can be tuned to the specific LED array 70 to meet the particular needs of the array. In one embodiment, the LED driver chip 68 will apply the maximum current that the particular LED array 70 requires. To dim the LED array 70, the LED driver chip 68 may employ pulse width modulation in a manner known to those of ordinary skill in the art.

Thus arranged, the PoE LED driver 38 provides the LED slave controller 40 with power from the bridge rectifier, and with a dimming control signal from the microcontroller 52, along the second power and communication link 17. In this way, the LED slave controller 40 need only include the LED driver chip 68. All other functionality (e.g., transformer, rectifier, signal processing) is provided by the circuitry of the PoE LED driver 38. Thus, power can be daisy chained from a single PoE LED driver 38 to a plurality of LED slave controllers 40.

Figure 4:
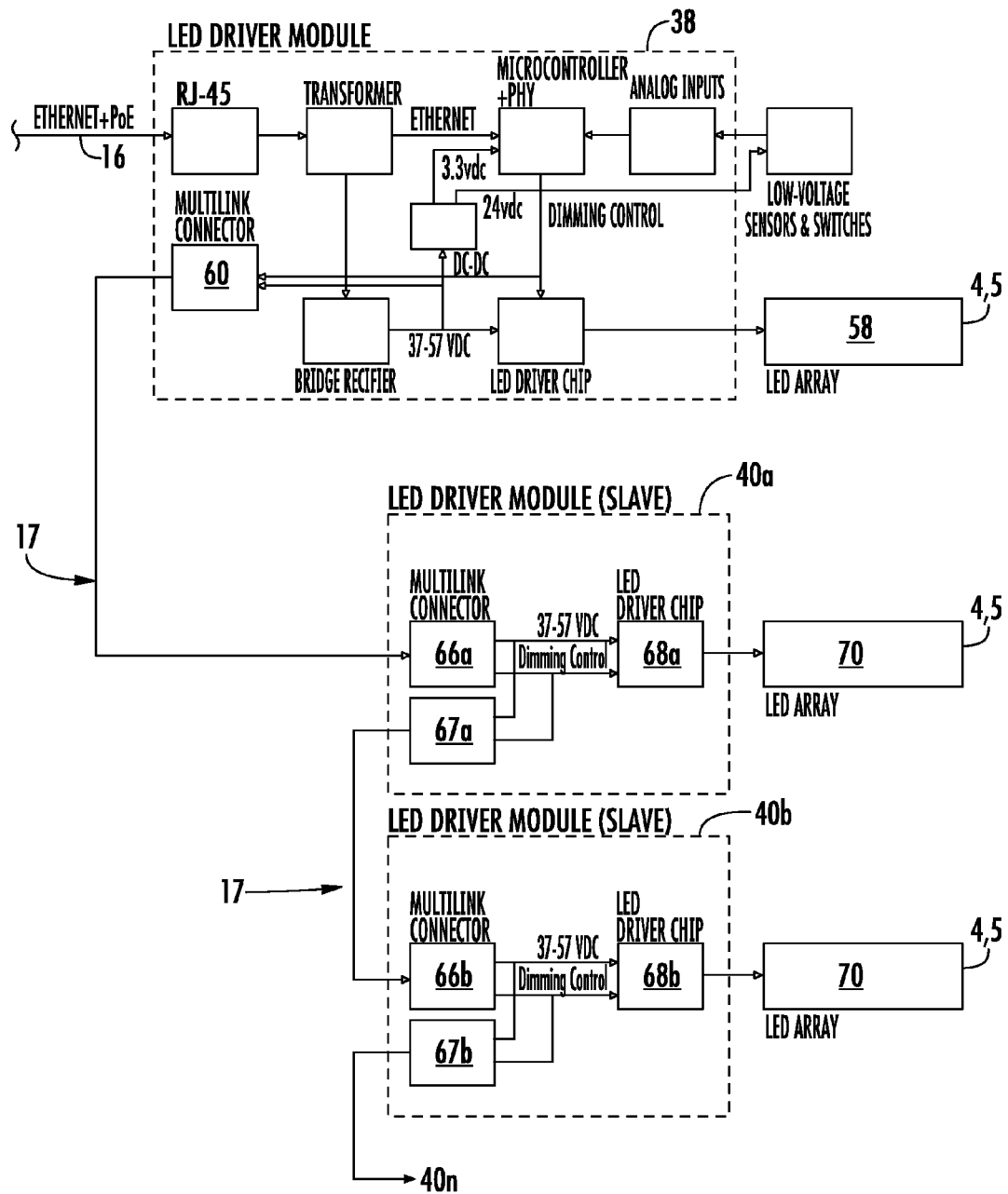
FIG. 4 is a schematic diagram of an exemplary PoE LED driver coupled to a plurality of LED slave controllers for the system of FIG. 2.
Figure 5:
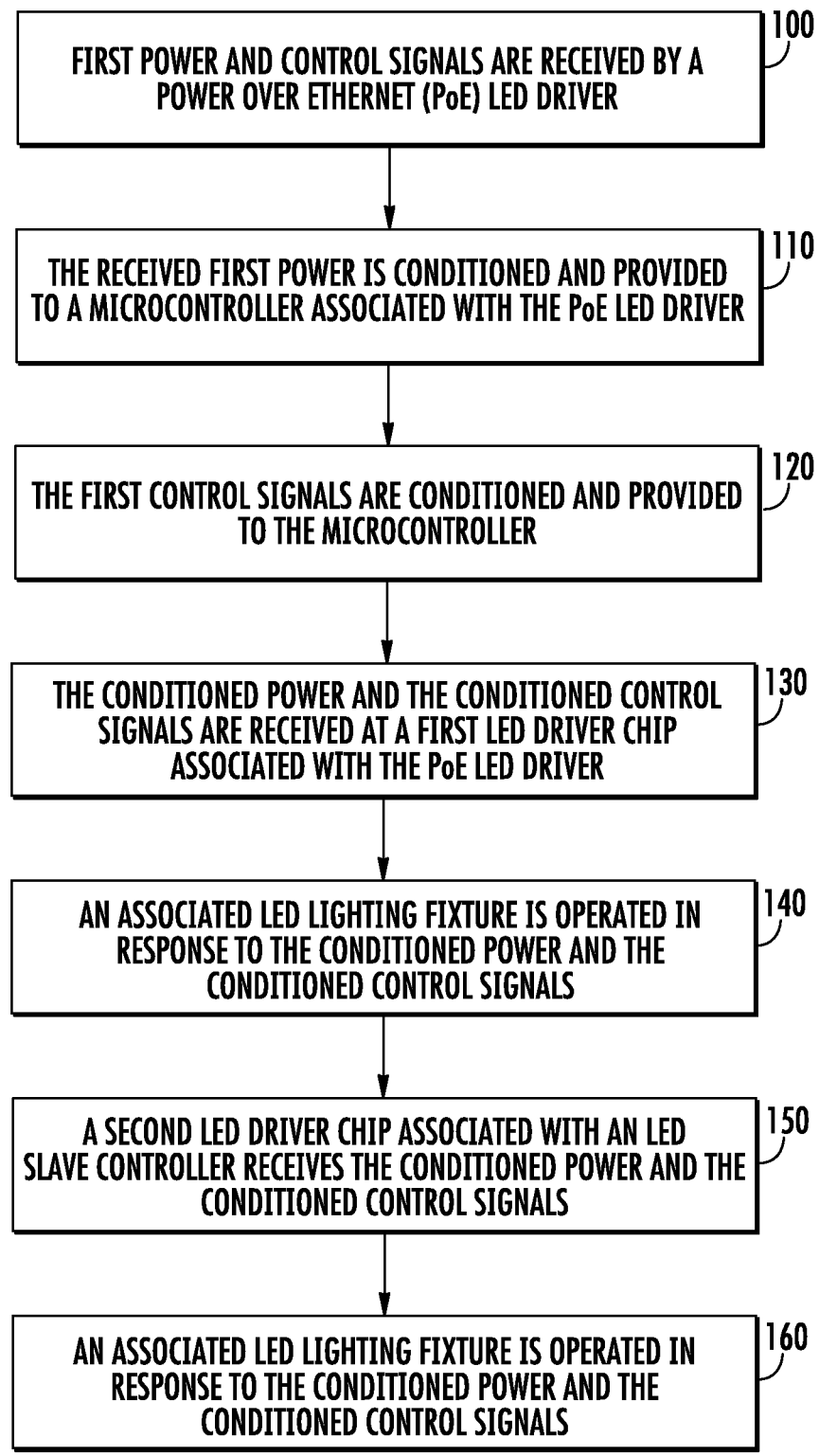
FIG. 5 is a flow chart illustrating an exemplary method of operating the disclosed system.

FIG. 4 shows an exemplary arrangement of such a daisy chained arrangement of LED slave controllers 40a, b . . . n. The PoE LED driver 38 of this embodiment can be the same as that described in relation to FIG. 3, and can be coupled to a first LED slave controller 40a via a second power and communications link 17. The second power and communications link 17 can be coupled to a first input connector 66a of the first LED slave controller 40a, which in turn, can be coupled to a first output connector 67a. The output connector 67a of the first LED slave controller 40a can then be coupled to a second input connector 66b of the second LED slave controller 40b. Additional LED slave controllers 40n can be coupled in the same manner to provide PoE power and signaling from the PoE LED driver 38 to all of the connected LED slave controllers 40a-n.

As previously noted, the total number of LED slave controllers 40 that can be fed from a single PoE LED driver 38 is limited only by the total amount of PoE deliverable via the first and second power and communications links 16, 17. Similarly, the LED driver chips 68 of the LED slave controllers 40 will be provided with the same dimming and other control information, via the second power and communication link 17, as is provided to the LED driver chip 56 of the PoE LED driver 38.

It will be appreciated that although the second power and communication link 17 may be an RJ-45/CAT5/CAT6 or other appropriate connection, the control signals and the power carried on the second power and communication link 17 and delivered to the LED slave controllers 40 will be different from the control signals and power delivered to the PoE LED driver 38 from the PoE switch 2. This is because the control signals and power delivered to the LED slave controllers 40 is conditioned by the circuitry of the PoE LED driver 38 prior to delivering it to the LED slave controllers.

Each PoE LED driver 38 may constitute a single IP client in the form of microcontroller 52, and thus all of the first and second light fixtures 4, 5 may be controlled together via the microcontroller. In some embodiments the microcontroller 52 generates a single control signal that is provided to the LED driver chip 56 of the PoE LED driver 38, and is repeated to multiple LED driver chips 68 in succession, depending on the number of LED slave controllers 40 coupled to the PoE LED driver 38. In this way, all of the LED arrays 58, 70 associated with the PoE LED driver 38 and all of the slave controllers 40 can be controlled together using a single microcontroller 52. In one embodiment this simultaneous control may be an on-off control. In other embodiments this simultaneous control may be a dimming control using a known pulse width modulation (PWM) scheme.

In some embodiments, each LED slave controller 40 may be controlled individually. Under this scheme, the PoE LED driver 38 could be provided with multiple control channels, one for itself and one for each of the LED Slave controllers 40. The control message sent by the DRC 30 and received by the PoE LED driver 38 microcontroller 52 could contain control information for more than one channel. The control link on the slave connection could include a software addressing arrangement and each LED Slave controller 40 could include an arrangement for setting an address.

Referring now to FIG. 4, a method for using the disclosed system 1 will be described. At step 100, first power and control signals are received by a PoE LED driver 38. At step 110, the received first power is conditioned and provided to a microcontroller associated with the PoE LED driver 38. In some embodiments the received power is conditioned using a bridge rectifier 48, and optionally, a DC-DC converter 50. At step 120, the first control signals are conditioned and provided to the microcontroller. In some embodiments the received control signals are conditioned using a transformer 46. At step 130, the conditioned power and the conditioned control signals are received at a first LED driver chip associated with the PoE LED driver 38. At step 140, an associated LED lighting fixture is operated in response to the conditioned power and the conditioned control signals. In some embodiments, the LED lighting fixture includes an LED array 58. Operating the LED lighting fixture can include dimming the LED array 58. At step 150, a second LED driver chip associated with an LED slave controller 40 receives the conditioned power and the conditioned control signals. At step 160, an associated LED lighting fixture is operated in response to the conditioned power and the conditioned control signals. In some embodiments, the LED lighting fixture includes an LED array 70. Operating the LED lighting fixture can include dimming the LED array 70.

In some embodiments the first power and control signals can be provided to the PoE driver via a first power and control signal communication link, while conditioned power and conditioned control signals can be provided to the second LED driver chip via a second power and control signal communication link. In some embodiments the first and second power and control signal communication links are CAT5/CAT6 cables or any other cable type capable of carrying power and control signals.

Some embodiments of the disclosed device may be implemented, for example, using a storage medium, a computer-readable medium or an article of manufacture which may store an instruction or a set of instructions that, if executed by a machine (i.e., processor or microcontroller), may cause the machine to perform a method and/or operations in accordance with embodiments of the disclosure. Such a machine may include, for example, any suitable processing platform, computing platform, computing device, processing device, computing system, processing system, computer, processor, or the like, and may be implemented using any suitable combination of hardware and/or software. The computer-readable medium or article may include, for example, any suitable type of memory unit, memory device, memory article, memory medium, storage device, storage article, storage medium and/or storage unit, for example, memory (including non-transitory memory), removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision additional modifications, features, and advantages within the scope and spirit of the claims appended hereto.

What is claimed is:

1. A system for controlling an LED lighting system, comprising:
   a Power over Ethernet (PoE) LED driver coupleable to a PoE switch via a first power and communication link, the PoE LED driver comprising a microcontroller for receiving first power and control signals from the PoE switch and for controlling a first LED driver chip to operate an associated LED lighting fixture in response thereto;
   an LED slave controller coupled to the PoE driver via a second power and communication link, the LED slave controller including a second LED driver chip configured to receive second power and control signals from the microcontroller to operate an associated LED lighting fixture in response thereto;
   wherein the first power and control signals are different from the second power and control signals; and
   wherein the first power and communication link comprises a category 5 (CAT5), category 6 (CAT6) cable, or any other cable type capable of carrying power and control signals.

2. The system of claim 1, further comprising a second LED slave controller coupled to the first LED slave controller, the second LED slave controller configured to receive the second power and control signals via the first LED slave controller and to operate an associated LED lighting fixture in response thereto.

3. The system of claim 2, further comprising a third LED slave controller coupled to the second LED slave controller, the third LED slave controller configured to receive the second power and control signals via the second LED slave controller and to operate an associated LED lighting fixture in response thereto.

4. The system of claim 1, further comprising a low voltage device coupled to the microcontroller for providing an analog input signal to the microcontroller.

5. The system of claim 4, wherein the low voltage device is selected from the list consisting of an occupancy sensor, a photodetector and a switch.

6. The system of claim 1, the PoE LED driver comprising an Ethernet transformer for receiving the first control signals from the first power and communication link and for providing conditioned first control signals to the microcontroller.

7. The system of claim 6, the PoE LED driver comprising a bridge rectifier for receiving the first power from the first power and communication link and for providing rectified direct current (DC) power to the microcontroller.

8. The system of claim 7, the PoE LED driver comprising a DC-DC power converter for receiving DC power from the bridge rectifier and for providing a first voltage to the microcontroller and a second voltage to an associated low voltage device.

9. The system of claim 1, wherein the first and second LED driver chips are configured to dim an LED array of the associated LED lighting fixture in response to a command from the microcontroller.

10. The system of claim 1, wherein at least one of the first and second LED driver chips comprises a circuit, a discrete chip, or a combination thereof.

11. The system of claim 1, wherein the second power and communication link comprises a category CAT5 cable, a CAT6 cable, or other cable type.

12. A system for controlling an LED lighting system, comprising:
a Power over Ethernet (PoE) LED driver coupleable to a PoE switch via a first power and communication link, the PoE LED driver comprising a microcontroller for receiving first power and control signals from the PoE switch and for controlling a first LED driver chip to operate an associated LED lighting fixture in response thereto;
a plurality of LED slave controllers, each of said plurality of LED slave controllers including a second LED driver chip for receiving second power and control signals from the microcontroller on one of a plurality of second power and communication links to operate an associated LED lighting fixture in response thereto;
wherein a first one of said plurality of LED slave controllers is coupled to the first LED driver chip of the PoE LED driver via a first one of said plurality of second power and communication links, a second one of said plurality of LED slave controllers is coupled to the first one of said plurality of LED slave controllers via a second one of said plurality of second power and communication links, and a third one of said plurality of LED slave controllers is coupled to the second one of said plurality of LED slave controllers via a third one of said plurality of second power and communication links;
wherein the first power and control signals are different from the second power and control signals; and
wherein the first power and communication link and the plurality of second power and communication links comprise CAT5 or CAT6 cables or any other cable type capable of carrying power and control signals.

13. The system of claim 12, further comprising a low voltage device coupled to the microcontroller for providing an analog input signal to the microcontroller, the low voltage device selected from the list consisting of an occupancy sensor, a photodetector and a switch.

14. The system of claim 12, the PoE LED driver comprising:
an Ethernet transformer for receiving the first control signals from the first power and communication link and for providing conditioned first control signals to the microcontroller; and
a bridge rectifier for receiving the first power from the first power and communication link and for providing rectified direct current (DC) power to the microcontroller.

15. The system of claim 12, wherein the first LED driver chip and the plurality of second LED driver chips are configured to dim an LED array of the associated LED lighting fixture in response to a command from the microcontroller.

16. The system of claim 12, wherein the second power and communication link comprises a category CAT5 cable, CAT6 cable, or other cable type.

17. The system of claim 12, wherein at least one of first LED driver chip and the plurality of second LED driver chips comprises a circuit, a discrete chip, or a combination thereof.

18. A method for controlling an LED lighting system, comprising:
receiving, at a Power over Ethernet (PoE) LED driver, first power and control signals;
conditioning the received first power and providing the conditioned power to a microcontroller associated with the PoE LED driver;
conditioning the first control signals and providing the conditioned control signals to the microcontroller;
receiving, at a first LED driver chip associated with the PoE driver, the conditioned power and the conditioned control signals and operating an LED lighting fixture in response thereto; and
receiving, at a second LED driver chip associated with an LED slave controller, the conditioned power and the conditioned control signals and operating an LED lighting fixture in response thereto;
wherein the first power and control signals are provided to the PoE driver via a first power and control signal communication link, and the conditioned power and conditioned control signals are provided to the second LED driver chip via a second power and control signal communication link; and
wherein the first power and control signal communication link comprises a CAT5 or CAT6 cable, or any other cable type capable of carrying power and control signals.

19. The method of claim 18, further comprising receiving, at a second LED slave controller coupled to the LED slave controller, the conditioned power and the conditioned control signals and operating an associated LED lighting fixture in response thereto.

20. The method of claim 19, further comprising receiving, at a third LED slave controller coupled to the second LED slave controller, the conditioned power and control signals and operating an associated LED lighting fixture in response thereto.

21. The method of claim 18, further comprising receiving, at the microcontroller, an analog input from a low voltage device selected from the list consisting of an occupancy sensor, a photodetector and a switch.

22. The method of claim 18, the first control signals are conditioned using an Ethernet transformer.

23. The method of claim 18, wherein the first power is conditioned using a bridge rectifier.

24. The method of claim 18, wherein operating an LED lighting fixture comprises dimming an LED array associated with the LED lighting fixture.

25. The method of claim 18, wherein the second power and control signal communication link comprises a CAT5 cable, a CAT6 cable, or other cable type.

26. The method of claim 18, wherein at least one of the first and second LED driver chips comprises a circuit, a discrete chip, or a combination thereof.

\* \* \* \* \*